United States Patent
Lee et al.

(10) Patent No.: US 11,569,903 B2
(45) Date of Patent: Jan. 31, 2023

(54) OVERLAY OF A FORWARD LINK ON BROADBAND SATELLITE SIGNALS

(71) Applicant: Hughes Network Systems, LLC, Germantown, MD (US)

(72) Inventors: Lin-Nan Lee, Potomac, MD (US); Udaya Bhaskar, North Potomac, MD (US)

(73) Assignee: Hughes Network Systems, LLC, Germantown, PA (US)

( * ) Notice: Subject to any disclaimer, the term of this patent is extended or adjusted under 35 U.S.C. 154(b) by 32 days.

(21) Appl. No.: 17/135,378

(22) Filed: Dec. 28, 2020

(65) Prior Publication Data

US 2022/0209850 A1 Jun. 30, 2022

(51) Int. Cl.
*H04B 7/185* (2006.01)
*H04L 45/64* (2022.01)

(52) U.S. Cl.
CPC ..... *H04B 7/18513* (2013.01); *H04B 7/18515* (2013.01); *H04L 45/64* (2013.01)

(58) Field of Classification Search
CPC ............ H04B 7/18513; H04B 7/18515; H04B 7/1851–18521; H04L 45/64
See application file for complete search history.

(56) References Cited

U.S. PATENT DOCUMENTS

| | | | | |
|---|---|---|---|---|
| 6,400,925 B1* | 6/2002 | Tirabassi | ........... | H04Q 11/0478 455/12.1 |
| 2011/0216810 A1 | 9/2011 | Kumar | | |
| 2014/0036765 A1* | 2/2014 | Fujimura | ........... | H04B 7/18515 370/316 |
| 2014/0133530 A1* | 5/2014 | Maguire | ................ | H01Q 21/28 375/219 |
| 2018/0316417 A1* | 11/2018 | Motoyoshi | ........... | H04B 7/2041 |
| 2020/0120458 A1 | 4/2020 | Aldana et al. | | |
| 2020/0367069 A1* | 11/2020 | Struhsaker | ......... | H04B 7/18593 |
| 2021/0273719 A1* | 9/2021 | Wang | ................ | H04B 7/18513 |

FOREIGN PATENT DOCUMENTS

CN 109412641 A 3/2019

OTHER PUBLICATIONS

International Search Report and Written Opinion for PCT/US2021/064807 dated Apr. 8, 2022, all pages.

* cited by examiner

*Primary Examiner* — Khaled M Kassim
*Assistant Examiner* — Najeeb Ansari
(74) *Attorney, Agent, or Firm* — Kilpatrick Townsend & Stockton, LLP (57) ABSTRACT

Various arrangements for a satellite-based forward link overlay are presented herein. In some embodiments, broadband data is modulated at a particular frequency, phase, and/or timing to create a broadband data signal. The frequency, phase, and/or timing are used to modulate a low-bandwidth data signal. The low-bandwidth data signal can then be combined with the broadband data signal and transmitted via satellite to a geographic region. A low-bandwidth receiver unit may determine the frequency, phase, and/or timing from the embedded broadband signal and use such information to demodulate and despread the low-bandwidth data signal.

17 Claims, 6 Drawing Sheets

OVERLAY OF A FORWARD LINK ON BROADBAND SATELLITE SIGNALS

BACKGROUND

Internet access, or more generally, network access can be performed via a satellite connection between user equipment (UE) and a satellite gateway. Such an arrangement can allow UE located away from terrestrial networks to obtain high-speed broadband internet and network access. However, for some devices, such as IoT devices, a broadband network connection may not be available or needed.

SUMMARY

In some embodiments, a satellite-based forward link overlay system is presented. The system can include a gateway system that transmits data to a satellite for relaying to user equipment. The gateway system can include a broadband data transmission modulator. The broadband data transmission modulator can: receive broadband data from the Internet; modulate the broadband data; output a broadband data signal that comprises the modulated broadband data for transmission to the satellite; and output, separate from the broadband data signal, indications of a frequency, a phase, and a timing of the broadband data signal. The gateway system can include an overlay data transmission modulator configured to: receive the indication of the frequency, the phase, and the timing of the broadband data signal; receive low-bandwidth data from the Internet; modulate the low-bandwidth data based on the indication of the frequency and the timing received from the broadband data transmission modulator; and output a low-bandwidth data signal that comprises the modulated low-bandwidth data for transmission to the satellite. The gateway can include a combiner configured to: combine the output low-bandwidth data signal with the broadband data signal to create a combined forward link signal; cause the combined forward link signal to be transmitted to the satellite.

Embodiments of such a system can include one or more of the following: A low-bandwidth receiver unit may be part of the system that comprises: a broadband state recovery system configured to determine the frequency and the timing of the broadband data signal; and a low-bandwidth receiving system configured to despread and demodulate the low-bandwidth data signal based on the frequency and the time of the broadband data signal received from the broadband state recovery system. The combiner can be configured to combine the output low-bandwidth data signal with the broadband data signal such that the power of the low-bandwidth data signal is less than 5% of the power of the broadband data signal within the combined forward link signal. A spreading factor may be used by the overlay data transmission modulator to modulate the low-bandwidth data that is at least one hundred. The combiner may be configured to combine the output low-bandwidth data signal with the broadband data signal such that no additional bandwidth is used by the low-bandwidth data signal beyond the broadband data signal. The satellite may be configured to receive the combined forward link signal and retransmit the combined forward link signal to a geographic region. A low-bandwidth antenna may be connected with the low-bandwidth receiver unit, the low-bandwidth antenna having an antenna gain of less than 0 dB. A broadband terminal may be present that is configured to receive the broadband data signal but not demodulate the low-bandwidth data signal, wherein the broadband terminal provides Internet access. A broadband antenna may be connected with the broadband terminal, wherein the broadband antenna has a gain of greater than 10 dB and is physically larger than the low-bandwidth antenna. The low-bandwidth receiver unit may not demodulate or decode the broadband data signal. The low-bandwidth receiver unit may be further configured to output the low-bandwidth data signal. The low-bandwidth receiver unit may communicate with an Internet of Things (IoT) device and the low-bandwidth data signal comprises IoT data.

In some embodiments, a method for overlaying an overlay forward link on a broadband data signal may be presented. The method may include receiving, by a gateway system, broadband data from the Internet. The method may include modulating, by the gateway system, the broadband data to create a broadband data signal. The method may include determining indications of a frequency, a phase, and a timing of the broadband data signal. The method may include receiving, by the gateway system, low-bandwidth data from the Internet. The method may include modulating, by the gateway system, the low-bandwidth data based on the indication of the frequency, the phase, and the timing. The method may include creating, by the gateway system a low-bandwidth data signal that comprises the modulated low-bandwidth data. The method may include combining the broadband data signal with the low-bandwidth data signal to create a combined forward link signal.

Embodiments of such a method can include one or more of the following features: The method may include transmitting, by the gateway system, the combined forward link signal to a satellite. The method may include despreading and demodulating, by a low-bandwidth receiver unit, the low-bandwidth data signal based on the frequency, the phase, and the timing of the broadband data signal. The method may include combining the low-bandwidth data signal with the broadband data signal such that the power of the low-bandwidth data signal is less than 5% of the power of the broadband data signal within the combined forward link signal. The method may include using a spreading factor used by the overlay data transmission modulator to modulate the low-bandwidth data that is at least one hundred. The method may include receiving, by a satellite, the combined forward link signal; and retransmitting, by the satellite, the combined forward link to a geographic region. The method may include demodulating, by a broadband terminal, the broadband data signal but not the low-bandwidth data signal, wherein the broadband terminal provides Internet access to one or more computerized devices. The low-bandwidth receiver unit may not demodulate or decode the broadband data signal.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Broadband access is a term typically used to describe high-speed Internet access as compared to dial-up phone-based modem Internet access. Broadband access may be realized via digital satellite service (DSS). Broadband DSS internet access can include a ground-based gateway system serving as a connection between the Internet and a satellite system. The gateway may transmit and receive data from the satellite. The satellite may serve to relay data to and from various terminals that are geographically dispersed.

The available bandwidth for relaying data between the gateway system and the terminals via the satellite may be used or reserved for broadband access. Therefore, little, if any, additional reserved bandwidth is available for additional data services. While broadband access may be required for certain use cases, such as video and/or audio streaming, web browsing, networking, and general home use, there can be other use cases that require significantly less data to be transmitted, possibly with more lenient latency requirements. For example, the Internet of Things (IoT) refers to various devices that can have sensors embedded and/or can exchange data with other devices via a network connection. For example, IoT devices can include: water sensors, agricultural sensor, hazard sensors, location sensors, flow sensors, pressure sensors, temperature sensors, alarm sensors, other types of sensors, state monitoring devices, etc. Such devices may periodically or occasionally need to receive and/or transmit data. Further, the amount of data to be transmitted to such IoT devices may be relatively small in size (compared to broadband data) and can have relatively lenient latency requirements. For example, there may be little practical effect if transmission of forward link IoT data is delayed several seconds or even several minutes or that the data transfer rate is low compared to broadband. Therefore, data to be transmitted to some types of devices, such as IoT devices, may not require broadband access and can instead use an overlay data link, which can also be referred to as an IoT data link.

Embodiments detailed herein are focused on overlaying a lower-speed overlay forward link (from the gateway to the terminal) on to bandwidth of a satellite network being used for broadband access. The bandwidth of the satellite may already be reserved for transmitting broadband data via forward link broadband services to terminals. However, it can be possible to overlay a low-speed forward link over the broadband signal. The overlay data may be spread and modulated based on the frequency, timing, and/or phase of the broadband signal, but at a much lower power level than the broadband data. Since the broadband data is transmitted at a significantly higher power level, the overlay signal only affects the noise floor level of the broadband signal by a small amount that can be ignored, filtered out by receiving broadband terminals, or otherwise has a negligible effect on the performance of the receiving broadband terminals. The broadband signal to be transmitted may be combined with the much lower power overlay signal to be transmitted to the satellite as a combined signal. The combined signal may be received by the satellite and relayed to one or more geographically-dispersed terminals on the ground.

A device, such as an IoT device, may use a small antenna to receive the combined signal from the satellite. Use of the small antenna combined with the overlay signal being very low power may make it difficult or impossible to successfully obtain the overlay signal from the combined signal. However, the frequency, phase, and/or timing of the broadband signal can be determined since the broadband signal has a much higher power level within the combined signal. Since the frequency, phase, and/or timing of the broadband signal was used to spread and modulate the overlay data signal, the determined frequency, phase, and/or timing can be used to obtain the overlay data from the combined signal.

Figure 1:
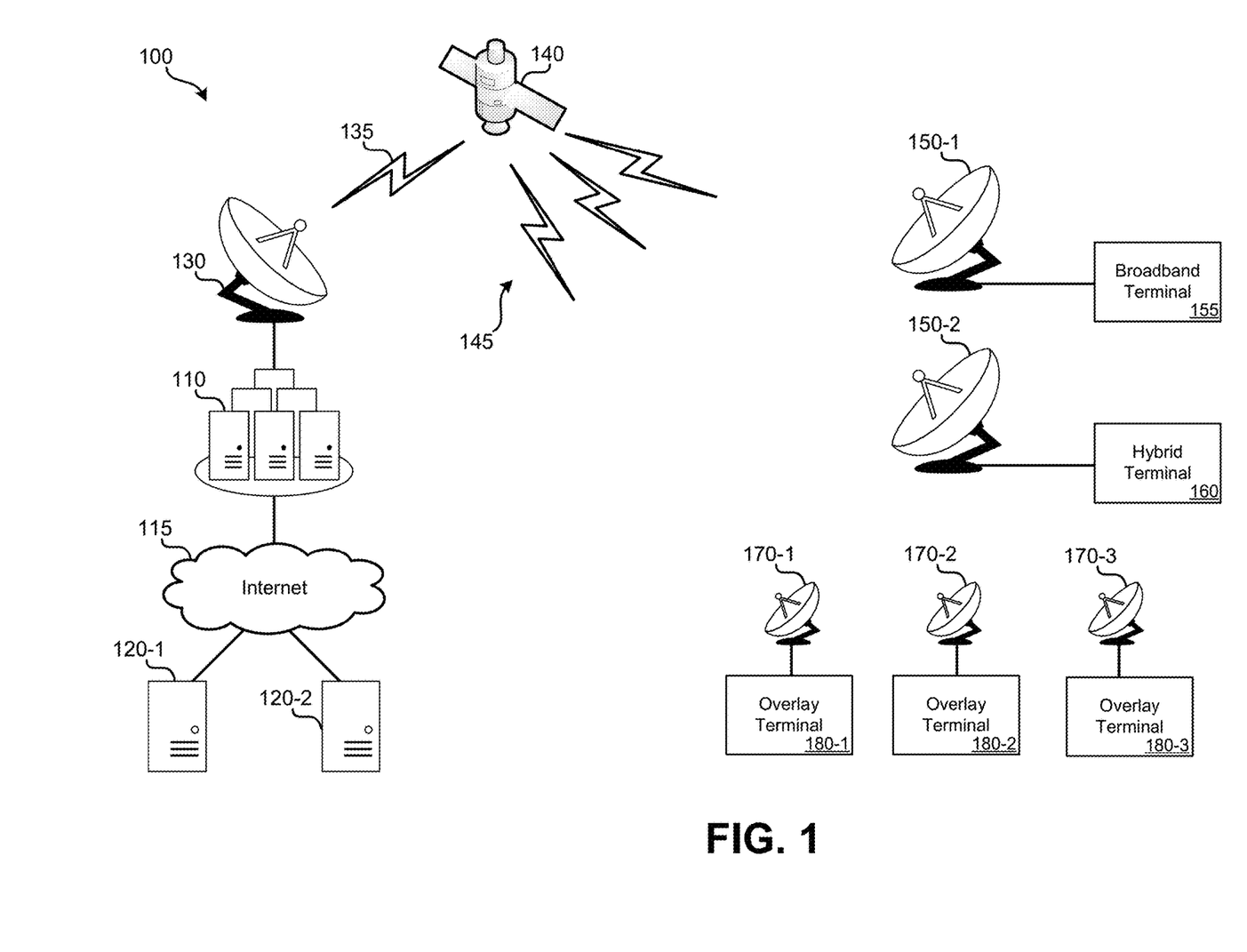
FIG. 1 illustrates an embodiment of a satellite-based forward link overlay system.

Further detail regarding such embodiments is provided in relation to the figures. FIG. 1 illustrates an embodiment of a satellite-based forward link overlay system 100 ("system 100"). System 100 can include: gateway system 110; Internet 115; Internet accessible server systems 120 (e.g., 120-1, 120-2); gateway satellite antenna 130; forward uplink 135; satellite 140; forward downlink 145; broadband satellite antennas 150 (e.g., 150-1 and 150-2); broadband terminal 155; hybrid terminal 160; overlay satellite antennas 170 (e.g., 170-1, 170-2, and 170-3); and overlay terminals 180 (e.g., 180-1, 180-2, and 180-3).

Gateway system 110 may serve as a bridge or gateway between a satellite communication network and one or more networks, such as Internet 115. Via gateway system 110, various terminals that are physically separated from gateway system 110 can communicate with remote computer systems, such as Internet accessible server systems 120. In addition to an alternate to gateway system 110 communicating with Internet 115, various other networks, which may be public or private may be accessed.

For the purposes of the example of FIG. 1, server system 120-1 may be using gateway system 110 to communicate with broadband terminal 155. Server system 120-2 may be using gateway system 110 to communicate with overlay terminal 180-1. As an example, the data being exchanged between server system 120-1 and broadband terminal 155 may be broadband data while the data being exchanged between server system 120-2 and overlay terminal 180-1 may be performed using an overlay forward link.

Gateway system 110 may use one or more satellite antennas, such as gateway satellite antenna 130, to communicate with satellite 140. The same or separate antennas may be used to receive data from satellite 140 and transmit data to satellite 140. Satellite 140 may be in low earth orbit (LEO), middle earth orbit (MEO), or geosynchronous orbit (GEO) (e.g., geostationary orbit). Satellite 140 may function as a "bent pipe." This can mean that satellite 140 receives a signal from gateway satellite antenna 130, such as forward uplink 135 and retransmits the signal, on the same or different frequency, as forward downlink 145 over a geographical area, such as via a spot beam. Similarly, a reverse uplink signal may be sent by a terminal to satellite 140, which may then be sent by satellite 140 to gateway system 110 as a reverse downlink signal to gateway satellite antenna 130. Further detail regarding the functionality of gateway system 110 is provided in relation to FIG. 2.

Broadband terminals, hybrid terminals, and overlay terminals may be part of, or connected directly with, a device that requires network access. Additionally or alternatively, such terminals may serve as an access point (AP) for one or more additional devices. For instance, multiple networked devices may be in communication with broadband terminal 155 in order to communicate with remote computer systems via the Internet. Further, a terminal may be connected with a networking device, such as a router, which operates a local wired (e.g., Ethernet) or wireless network (e.g., WiFi network) and routes traffic between the terminal and various devices that use network access.

Broadband satellite antenna 150-1 may be a conventional dish satellite antenna that operates in the range of a 10-12 dB signal to noise ratio (SNR) during clear sky conditions for communication with satellite 140. In some embodiments, the dish of broadband satellite antenna 150-1 may be 18 inches (457 mm) or greater in diameter. Broadband terminal 155 may be able to receive and transmit broadband data via broadband satellite antenna 150-1 and satellite 140 with gateway system 110. Broadband terminal 155 may not be able to receive or otherwise access an overlay signal embedded with the broadband signal. From the point of view of broadband terminal 155, any overlay signal present within a combined downlink signal received from satellite 140 may appear to be part of the noise floor and may have no or only a minimal effect on reception and demodulation of a broadband signal.

Hybrid terminal 160 may be in communication with broadband satellite antenna 150-2. Broadband satellite antenna 150-2 may be similar to broadband satellite antenna 150-1. Hybrid terminal 160 may be configured to receive broadband data and overlay data. Further detail regarding hybrid terminal 160 is provided in relation to FIG. 4.

Overlay satellite antenna 170-1 may be used to receive and send signals between satellite 140 and overlay terminal 180-1. Overlay satellite antenna 170-1 may have a smaller diameter than a conventional dish satellite antenna (e.g., smaller than dish or phased array satellite antenna 150-1) and may operate at much lower signal to noise (SNR) as compared to a broadband terminal (for e.g., in the range of −3 dB to −5 dB SNR) during clear sky conditions for communication with satellite 140. Therefore, a difference in antenna gain of at least 10 dB or even 15 dB may exist between broadband satellite antenna 150-1 and overlay satellite antenna 170-1. Physically, the diameter of overlay satellite antenna 170-1 may be between 2-4 inches if the satellite is in LEO or MEO orbit or may be between 8-12 inches if the satellite is in GEO orbit. The antenna gain may be 0 dB or lower. In other embodiments, a same type and/or size of dish antenna may be used for both broadband and overlay terminals. Of note, since an overlay signal can be transmitted at a much lower power level than a broadband signal (e.g., a difference of 100 times) and the 10 or even 15 dB difference in antenna gain, overlay terminal 180-1 may not be able to despread and demodulate the overlay signal without additional information. Further detail regarding overlay terminal 180-1 is provided in relation to FIG. 3.

Overlay terminals 180-2 and 180-3 may function as detailed for overlay terminal 180-1. Such overlay terminals may be geographically dispersed and use separate overlay satellite antennas 170-2 and 170-3 to communicate with satellite 140. Broadband terminals, hybrid terminals, and overlay terminals presented as part of system 100 are for simplicity. In practice, satellite 140 may be in communication with hundreds or thousands of broadband terminals, hybrid terminals, and/or overlay terminals via dish or phased-array antennas.

Figure 2:
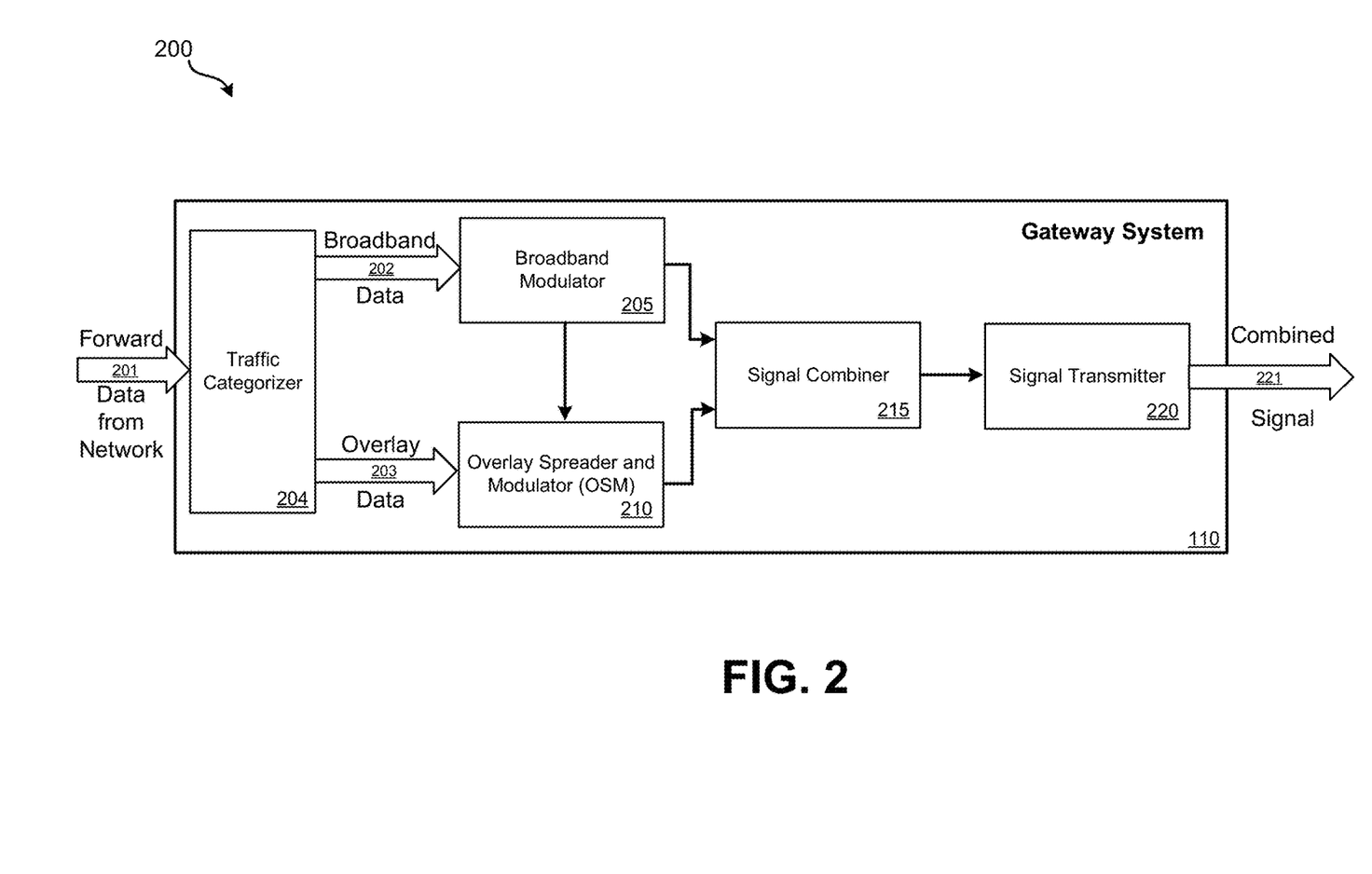
FIG. 2 illustrates an embodiment of a block diagram of a gateway system of a satellite-based forward link overlay system.

FIG. 2 illustrates an embodiment 200 of a block diagram of gateway system 110 of a satellite-based forward link overlay system. Gateway system 110 can include: traffic categorizer 204; broadband modulator 205; overlay spreader and modulator (OSM) 210; signal combiner 215; and signal transmitter 220. Such components may be implemented using digital signal processing componentry or specialized hardware designed for the task.

Gateway system 110 may receive broadband data 202 that is destined to be transmitted to various broadband or hybrid terminals via satellite. Gateway system 110 may also receive forward link data 201 from one or more networks, such as the Internet. Data 201 may be addressed to a particular terminal, which can be an overlay terminal, hybrid terminal, or broadband terminal. For example, data addressed to broadband terminal 155 may be received from server system 120-1, data addressed to overlay terminal 180-1 may be received from server system 120-2.

Traffic categorizer 204 may receive forward data 201, such as from the Internet, and may analyze such data to determine whether it should be handled as broadband data or overlay data. Traffic categorizer 204 may perform its analysis based on the destination terminal that is addressed by forward data 201. For example, all data addressed to broadband terminal 155 may be handled as broadband data 202; all data addressed to overlay terminal 180-1 may be handled as overlay data 203. In such embodiments, since traffic categorizer 204 functions based on the destination terminal, encrypted data may be properly categorized as broadband data 202 or overlay data 203 using only an unencrypted destination address.

In some embodiments, if hybrid terminals are used, traffic categorizer 204 may determine whether data addressed to a hybrid terminal should be treated as broadband data or overlay data. This determination may be based on the type of data, rules set regarding the hybrid terminal, and/or the amount of traffic being transmitted as broadband data or overlay data.

Broadband data 202 may be transmitted to broadband modulator 205. Broadband modulator 205 may modulate broadband data 202 centered around a particular frequency, having a particular phase, and using a particular timing. It may be possible that a small amount of frequency drift in the center frequency used for modulation occurs, such as due to temperature, operating tolerances, or other conditions. Therefore, while a particular center frequency may be desired for modulation, the actual frequency used for modulation may vary slightly. An indication of the actual frequency, actual phase, and/or actual timing (e.g., a frame marker or other type of reference) may be output by broadband modulator 205 that is distinct from the output modulated broadband signal. The indication of the actual frequency, actual phase, and/or actual timing can be output by broadband modulator 205 to OSM 210.

Overlay data 203 may be received from traffic categorizer 204. OSM 210 may perform a spreading process and modulation process to create an overlay signal. Spreading can involve a pseudorandom code (a "spreading code") being used to encode a lower data rate data signal. The pseudorandom code uses an auto-correlation function and can be combined with the data signal using an exclusive OR function. The creation of the overlay signal by OSM 210 may be performed such that the same carrier frequency indicated by the actual frequency received by broadband modulator 205 is used. Similarly, the same phase and timing received from broadband modulator 205 may be used for the spreading and modulation process performed by OSM 210. The spreading factor used by OSM 210 may be significant such as 500, 1000, or greater (or between 500 and 1000). Overlay data 203 may be modulated using binary phase shifted keying (BPSK).

A broadband signal created by broadband modulator 205 that includes broadband data 202 may be received by signal combiner 215. An overlay signal created by OSM 210 that includes overlay data 203 may be received by signal combiner 215. In some embodiments, signal combiner 215 adjusts the power level of each received signal. In other embodiments, broadband modulator 205 controls the power level of the broadband signal and OSM 210 controls the power level of the overlay signal. Regardless of which components control the power level of each signal, the broadband signal may be combined with the overlay signal such that the power level of the overlay signal is less than 5%, 1%, or even less than 0.5% of the power level of the broadband signal. Said another way, the overlay signal can be at least 15 dB or 20 dB weaker than the broadband signal within the combined signal. Signal combiner 215 combines the higher power level broadband signal with the lower power overlay signal to create a combined signal. Since OSM 210 used the same frequency for modulation, the frequency band of the overlay signal overlaps the frequency band of the broadband signal and does not use any additional bandwidth.

Signal combiner 215 may output the combined signal to signal transmitter 220 signal transmitter 220 may output an amplified combined signal 221 to a satellite gateway antenna for transmission to a satellite, such as detailed in relation to FIG. 1.

Figure 3:
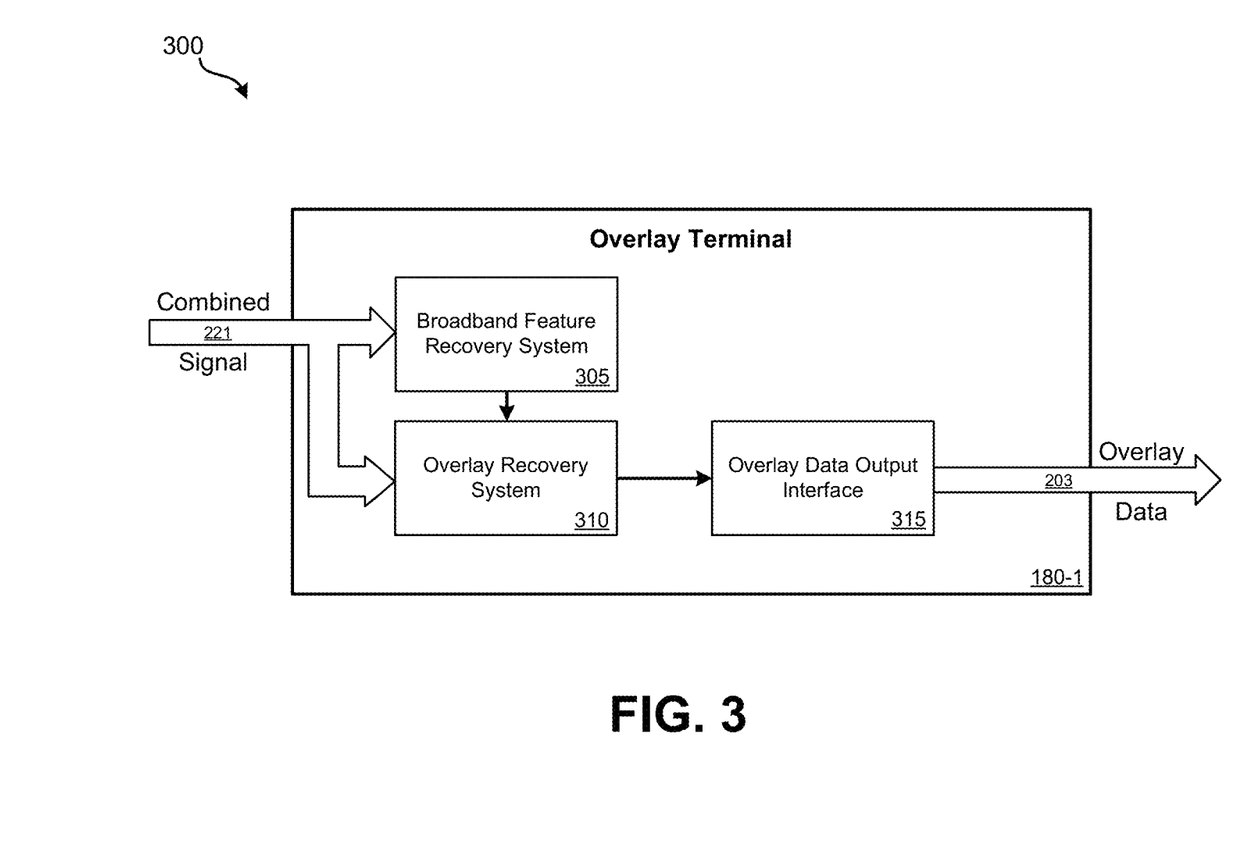
FIG. 3 illustrates an embodiment of a block diagram of an overlay terminal of a satellite-based forward link overlay system.

FIG. 3 illustrates an embodiment 300 of a block diagram of overlay terminal 180-1 of a satellite-based forward link overlay system. Overlay terminal 180-1 can also be representative of the functionality of other overlay terminals of FIG. 1. Overlay terminal 180-1 can include: broadband feature recovery system 305 ("BFRS 305"); overlay recovery system 310; and overlay data output interface 315. The components of overlay terminal 180-1 may be implemented using digital signal processing componentry or specialized hardware.

Combined signal 221 may be received from the satellite via an overlay antenna. Due to the low power level of the overlay signal and possibly the limited antenna gain of the overlay antenna, it may not be possible for the overlay signal to be obtained from the combined signal without additional processing and information. However, because the broadband signal was transmitted as part of the combined signal with such a higher power, it is possible for the broadband signal to be analyzed by BFRS 305. BFRS 305 can analyze the combined signal to determine the actual frequency, the actual phase, and/or the actual timing of the broadband signal. The presence of the overlay signal may not affect such detection due to the large power difference between the broadband signal and the overlay signal. An indication of the actual frequency, the actual phase, and/or the actual timing of the broadband signal may be output to overlay recovery system 310. Due to OSM 210 having used the actual frequency, the actual phase, and/or the actual timing of the broadband signal to perform spreading and modulation, obtaining these same values from the broadband signal can allow for the overlay signal to be obtained from the combined signal by overlay recovery system 310.

The recovered frequency, reference phase, and symbol timing from the broadband signal by broadband feature recovery system 305 along with the known fixed relationship between the broadband signal and spread and encoded overlay signal is used by overlay recovery system 310 to perform the despreading and demodulation of the overlay signal. By the timing being known, despreading can be performed by the same pseudorandom code being applied (e.g., via an exclusive OR function) with the proper timing to obtain the encoded data signal. By overlay recovery system 310 being provided with the actual frequency, phase and/or timing, hybrid terminal 160 does not have to perform a "modcod" (modulation and coding) detection process on the low-power overlay signal. The despreading process may allow for a 30 dB processing gain on the overlay signal such as if a spreading factor of 100 or greater (or even 1000 or greater) was used for spreading by OSM 210. The amount of processing can be increased further by using a larger spreading factor or decreased by using a smaller spreading factor. A smaller spreading factor may allow for a greater data throughput. Once despreading and demodulation has been performed by overlay recovery system 310, the overlay data may be output to overlay data output interface 350. Overlay data 203 may then be output to a separate component that determines whether the overlay data is addressed to overlay terminal 180-1 and should be further analyzed or should be discarded. Or overlay data that is addressed overlay terminal 180-1, the overlay data may be routed to an external device (e.g., an IoT device) or otherwise processed and/or stored by the overlay terminal.

Figure 4:
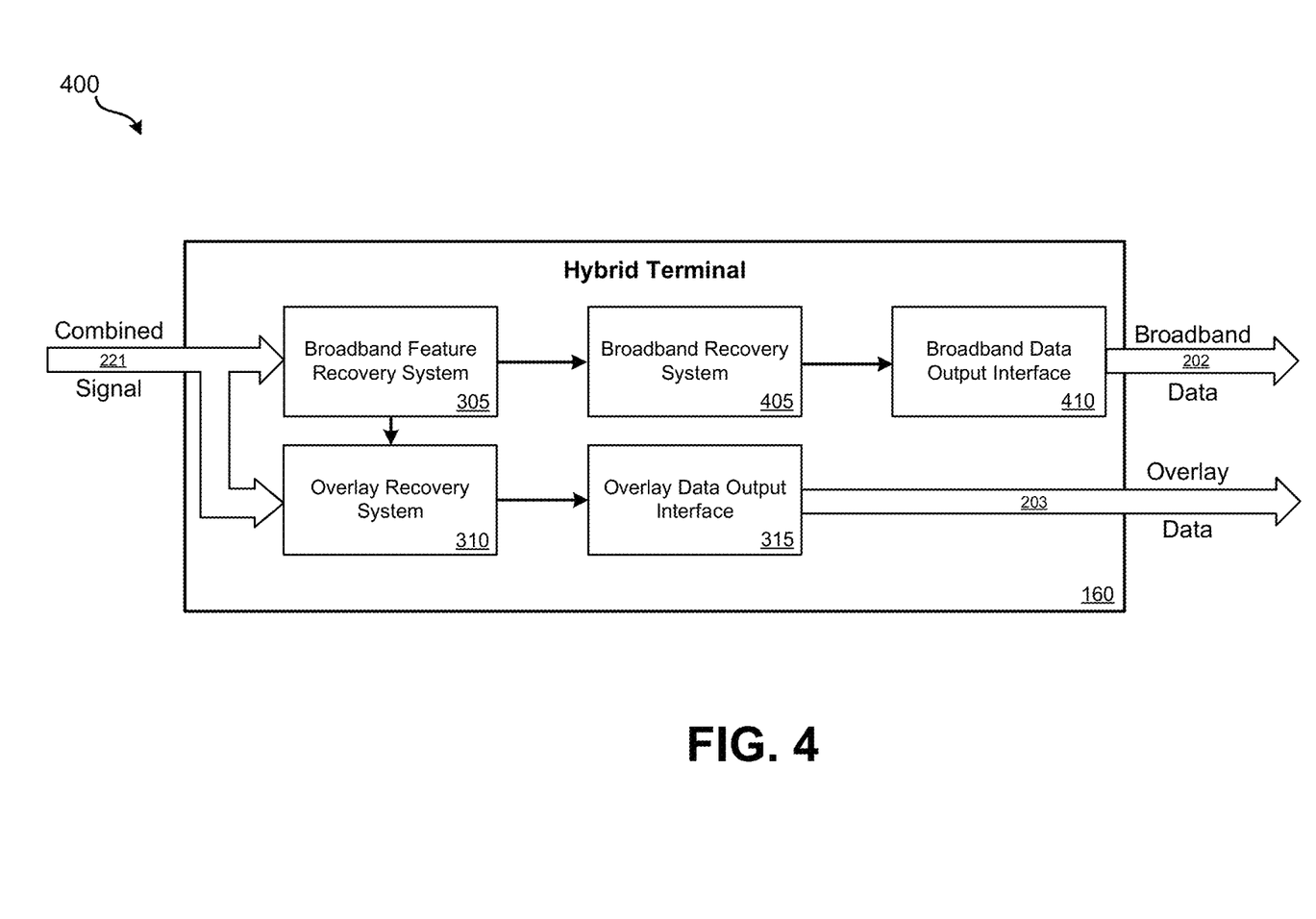
FIG. 4 illustrates an embodiment of a block diagram of a hybrid terminal of a satellite-based forward link overlay system.

FIG. 4 illustrates an embodiment 400 of a block diagram of hybrid terminal 160 of a satellite-based forward link overlay system. Hybrid terminal 160 can include: broadband feature recovery system 305, overlay recovery system 310, overlay data output interface 315, broadband recovery system 405, and broadband data output interface 410. Broadband feature recovery system 305, overlay recovery system 310, and overlay data output interface 315 may function as detailed in relation to overlay terminal 180-1 of FIG. 3. Hybrid terminal 160 may use broadband recovery system 405 to demodulate the broadband signal included as part of combined signal 221. Broadband data output interface 410 may output broadband data to another component or device or may analyze internally to determine whether the broadband data is addressed to hybrid terminal 160 and should be further processed as output or whether the broadband is addressed to another terminal and should be discarded. By having both overlay recovery system 310 and broadband recovery system 405, hybrid terminal 160 is able to receive broadband data 202 and overlay data 203.

Figure 5:
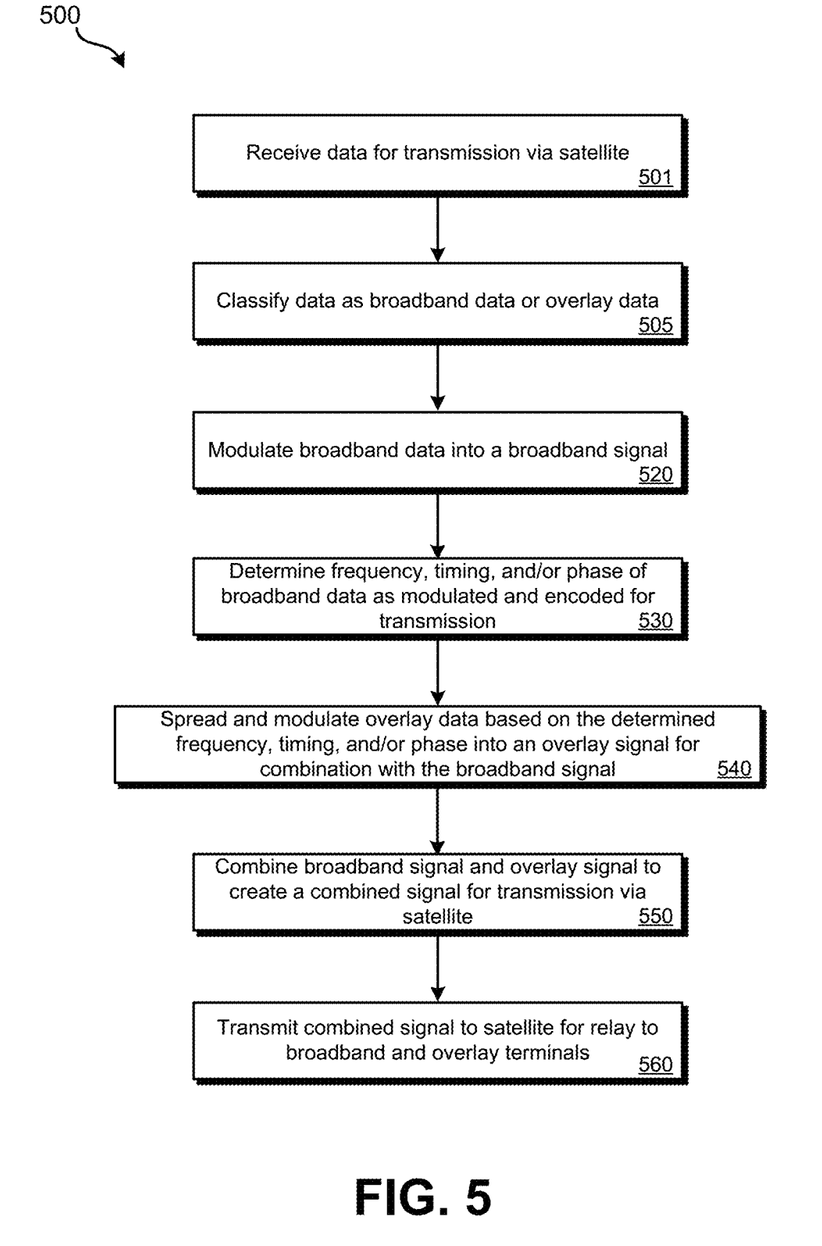
FIG. 5 illustrates an embodiment of a method for overlaying an overlay forward link on a broadband satellite signal by a gateway system.

Various methods may be performed using the systems and devices of FIGS. 1-4. FIG. 5 illustrates an embodiment of method 500 for overlaying an overlay forward link on a broadband satellite signal by a gateway system. Method 500 may be performed using system 100. More specifically, each step of method 500 may be performed by gateway system 110.

At block 501, the gateway system may receive data via the Internet or some other network that is addressed to a particular satellite terminal. If a large number of terminals is being communicated with, data for many terminals may be received within a short time period and may be relayed to the terminals via the satellite. The gateway system may analyze the received data and classify the data to be transmitted as either broadband data or overlay data at block 505 such as based on the type of terminal to which the data is to be transferred. Data classified as broadband data (that is, data to be sent via a broadband signal), may be modulated into a broadband signal at block 520.

The frequency, symbol timing, and/or carrier phase used for the modulation of the broadband signal may be determined at block 530. The values determined for the frequency, timing and/or carrier phase represent the actual characteristics present in the generated broadband signal. For example, the actual frequency may drift by a small delta from the intended frequency. The actual frequency, symbol timing, and/or carrier phase may be provided to another component that performs spreading and modulation for the data classified as overlay data.

At block 540, the overlay data may be spread and modulated based on the actual frequency, symbol timing, and/or phase that was used for modulation of the broadband signal. The overlay signal may be created such that it is significantly lower in power than the broadband signal. Alternatively, the power levels of the broadband signal and the overlay signal may be adjusted following their creation. For example, the overlay signal may be 100× weaker in power than the broadband signal.

At block 550, the broadband signal and the overlay signal may be combined together to create a combined signal. The overlay signal is centered around the same actual transmission frequency as the broadband signal and is narrowband compared to the broadband signal. Therefore, no additional bandwidth is used by the combined signal compared to the broadband signal. In some embodiments, hybrid terminals may also be present. Transmission of the combined signal to the satellite for relay to the broadband, hybrid, and/or overlay terminals can occur at block 560.

Figure 6:
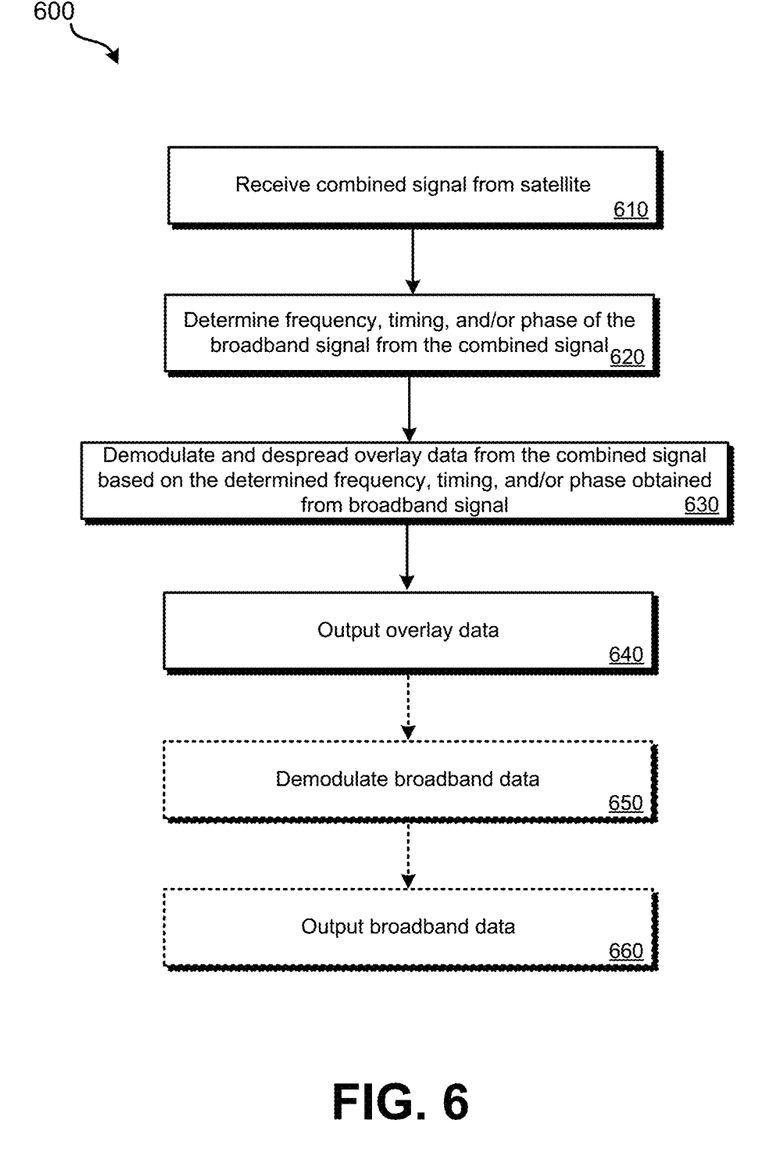
FIG. 6 illustrates an embodiment of a method for obtaining the overlay forward link from the broadband satellite signal by an overlay terminal.

FIG. 6 illustrates an embodiment of a method for obtaining the overlay forward link from the broadband satellite signal by an overlay terminal. Method 600 may be performed using system 100. More specifically, each step of method 600 may be performed by an overlay terminal, such as overlay terminal 180-1 (but may exclude blocks 650 and 660) or by a hybrid terminal, such as hybrid terminal 160. Method 600 may be performed separately or can be understood as performed with method 500 as single combined method for transmitting and receiving overlay data that is overlaid on a broadband signal.

At block 610, the combined signal, as retransmitted by a satellite, may be received via an overlay satellite antenna (or a broadband satellite antenna in the case of a hybrid terminal). At block 620, the frequency, symbol timing, and/or carrier phase of the broadband signal of the combined signal may be determined. In some embodiments, it may not be possible to perform correct detection of the frequency, symbol timing, and/or carrier phase of the overlay signal directly due to the antenna gain and power level of the overlay signal being so low. However, the broadband signal may be high enough in power that its frequency, symbol timing, and/or carrier phase can be determined. The terminal is configured such that the determined frequency, symbol timing, and/or phase of the broadband signal is known to also be the frequency, symbol timing, and/or phase of the overlay signal.

At block 630, demodulation and despreading of the overlay signal from the combined signal may be performed based on the frequency, symbol timing, and/or phase obtained from the broadband signal at block 620. While the overlay terminal may not be able to directly determine the frequency, symbol timing, and/or phase of the overlay signal, the overlay terminal can determine these characteristics from the broadband signal. Since it is known that these characteristics match the overlay signal, they then can be used to perform the demodulation and despreading of the overlay signal to obtain the overlay data. At block 640, the overlay data may be output. In some embodiments, only overlay data that is addressed to the terminal is output; other overlay data may be discarded. The overlay data addressed to the terminal may be provided to a separate device, such as an IoT device or may be locally processed as a command.

For an overlay terminal, the terminal may not be capable of demodulating the broadband signal. Therefore, while it can determine the frequency, timing, and/or phase of the broadband signal, no further processing of the broadband signal may be performed. This reduces the complexity and cost of the overlay terminal. However, a hybrid terminal may perform additional broadband processing. At block 650, broadband data may be demodulated. At block 660, the broadband data may be output. In some embodiments, only broadband data that is addressed to the terminal is output; other broadband data may be discarded. The broadband data addressed to the terminal may be provided to a separate device, such as an IoT device or may be locally processed as a command.

For transmitting overlay data from a terminal to the gateway system, the frequency, phase, and/or timing obtained at block 620 may also be used. A particular channel, which corresponds to a particular frequency slot, may be assigned to multiple (e.g., all, up to a fixed number) overlay terminals and/or hybrid terminals. The terminal may perform spreading (again here, by a factor of 500×, 1000×, or even greater) and modulation based on the frequency, phase, and/or timing obtained at block 620. The spreading can be beneficial for when collisions occur due to multiple terminals transmitting at the same time on the same channel. By using the recovered frequency, phase, and/or timing obtained at block 620, the amount of searching needing to be performed by the gateway system to receive data from the overlay terminals may be significantly decreased. Access techniques that include ALOHA, Slotted-ALOHA, scrambled multiple access (SCMA) or asynchronous scrambled multiple access (ASCMA) may be used for transmitting on the channel.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A satellite-based forward link overlay system, comprising:
   a gateway system that transmits data to a satellite for relaying to user equipment, the gateway system comprising:
      a broadband data transmission modulator configured to:
         receive broadband data from the Internet;
         modulate the broadband data;
         output a broadband data signal that comprises the modulated broadband data for transmission to the satellite; and
         output, separate from the broadband data signal, indications of a frequency, a phase, and a timing of the broadband data signal to an overlay data transmission modulator;
      the overlay data transmission modulator configured to:
         receive the indication of the frequency, the phase, and the timing of the broadband data signal from the broadband data transmission modulator;
         receive low-bandwidth data from the Internet;
         modulate the low-bandwidth data based on the indication of the frequency, the phase, and the timing received from the broadband data transmission modulator;
         output a low-bandwidth data signal that comprises the modulated low-bandwidth data for transmission to the satellite; and
      a combiner configured to:
         combine the output low-bandwidth data signal with the broadband data signal to create a combined forward link signal; and
         cause the combined forward link signal to be transmitted to the satellite; and
   a low-bandwidth receiver unit, comprising:
      a broadband state recovery system configured to determine the frequency, the phase, and the timing of the broadband data signal; and
      a low-bandwidth receiving system configured to:
         despread and demodulate the low-bandwidth data signal based on the frequency and the time of the broadband data signal received from the broadband state recovery system.

2. The satellite-based forward link overlay system of claim 1, wherein the combiner is configured to combine the output low-bandwidth data signal with the broadband data signal such that the power of the low-bandwidth data signal is less than 5% of the power of the broadband data signal within the combined forward link signal.

3. The satellite-based forward link overlay system of claim 1, wherein a spreading factor used by the overlay data transmission modulator to modulate the low-bandwidth data is at least one hundred.

4. The satellite-based forward link overlay system of claim 1, wherein the combiner is configured to combine the output low-bandwidth data signal with the broadband data signal such that no additional bandwidth is used by the low-bandwidth data signal beyond the broadband data signal.

5. The satellite-based forward link overlay system of claim 1, further comprising: the satellite configured to receive the combined forward link signal and retransmit the combined forward link signal to a geographic region.

6. The satellite-based forward link overlay system of claim 1, a low-bandwidth antenna connected with the low-bandwidth receiver unit, the low-bandwidth antenna having an antenna gain of less than 0 dB.

7. The satellite-based forward link overlay system of claim 6, further comprising:
   a broadband terminal that is configured to receive the broadband data signal but not demodulate the low-bandwidth data signal, wherein the broadband terminal provides Internet access.

8. The satellite-based forward link overlay system of claim 7, further comprising: a broadband antenna connected with the broadband terminal, wherein the broadband antenna has a gain of greater than 10 dB and is physically larger than the low-bandwidth antenna.

9. The satellite-based forward link overlay system of claim 1, wherein the low-bandwidth receiver unit does not demodulate or decode the broadband data signal.

10. The satellite-based forward link overlay system of claim 1, wherein the low-bandwidth receiver unit is further configured to output the low-bandwidth data signal.

11. The satellite-based forward link overlay system of claim 1, wherein the low-bandwidth receiver unit communicates with an Internet of Things (IoT) device and the low-bandwidth data signal comprises IoT data.

12. A method for overlaying an overlay forward link on a broadband data signal, the method comprising:
   receiving, by a gateway system, broadband data from the Internet, wherein the gateway system comprises an overlay data transmission modulator and a broadband data transmission modulator;
   modulating, by the broadband data transmission modulator of the gateway system, the broadband data to create a broadband data signal;
   determining indications of a frequency, a phase, and a timing of the broadband data signal;
   receiving, by the gateway system, low-bandwidth data from the Internet;
   modulating, by the overlay data transmission modulator of the gateway system, the low-bandwidth data based on the indication of the frequency, the phase, and the timing;
   creating, by the overlay data transmission modulator of the gateway system a low-bandwidth data signal that comprises the modulated low-bandwidth data;

combining the broadband data signal with the low-bandwidth data signal to create a combined forward link signal;

transmitting, by the gateway system, the combined forward link to a satellite;

determining, by a broadband state recovery system, the frequency, the phase, and the timing of the broadband data signal; and despreading and demodulating, by a low-bandwidth receiver unit, the low-bandwidth data signal based on the frequency, the phase, and the timing of the broadband data signal received from the broadband state recovery system.

13. The method for overlaying the overlay forward link on the broadband data signal of claim 12, wherein combining the broadband data signal with the low-bandwidth data signal to create the combined forward link signal comprises:

combining the low-bandwidth data signal with the broadband data signal such that the power of the low-bandwidth data signal is less than 5% of the power of the broadband data signal within the combined forward link signal.

14. The method for overlaying the overlay forward link on the broadband data signal of claim 12, wherein a spreading factor used by the overlay data transmission modulator to modulate the low-bandwidth data is at least one hundred.

15. The method for overlaying the overlay forward link on the broadband data signal of claim 12, further comprising:

receiving, by a satellite, the combined forward link signal; and retransmitting, by the satellite, the combined forward link to a geographic region.

16. The method for overlaying the overlay forward link on the broadband data signal of claim 12, further comprising:

demodulating, by a broadband terminal, the broadband data signal but not the low-bandwidth data signal, wherein the broadband terminal provides Internet access to one or more computerized devices.

17. The method for overlaying the overlay forward link on the broadband data signal of claim 12, wherein the low-bandwidth receiver unit does not demodulate or decode the broadband data signal.

* * * * *